US009476731B1

(12) United States Patent
Wilson

(10) Patent No.: US 9,476,731 B1
(45) Date of Patent: Oct. 25, 2016

(54) APPARATUS AND METHODS FOR ACCESSING AN ATLAS APPLICATION AND A COMPUTER READABLE MEDIUM HAVING THE ATLAS APPLICATION STORED THEREON AND EXECUTABLE BY THE APPARATUS

(71) Applicant: Flight Plan LLC, Southbury, CT (US)

(72) Inventor: Kenneth Wilson, Southbury, CT (US)

(73) Assignee: Flight Plan LLC, Southbury, CT (US)

( * ) Notice: Subject to any disclaimer, the term of this patent is extended or adjusted under 35 U.S.C. 154(b) by 0 days.

(21) Appl. No.: 14/595,790

(22) Filed: Jan. 13, 2015

Related U.S. Application Data

(60) Provisional application No. 61/930,365, filed on Jan. 22, 2014.

(51) Int. Cl.
   *G01C 21/36* (2006.01)
(52) U.S. Cl.
   CPC ............................... *G01C 21/3682* (2013.01)
(58) Field of Classification Search
   CPC .. H04W 4/046; H04L 67/06; G01C 21/3682; A01G 15/00; G01S 19/256; G01S 5/02; H04N 7/142
   USPC ............... 701/454, 410; 370/390; 455/456.1, 455/404.2; 423/240 R; 342/357.44; 348/14.02
   See application file for complete search history.

(56) References Cited

U.S. PATENT DOCUMENTS

| | | | | |
|---|---|---|---|---|
| 8,995,440 | B1 * | 3/2015 | LeBlanc | H04L 67/06 370/390 |
| 2001/0021365 | A1 * | 9/2001 | Keith | A01G 15/00 423/240 R |
| 2004/0029558 | A1 * | 2/2004 | Liu | G01S 5/02 455/404.2 |
| 2007/0247515 | A1 * | 10/2007 | Roman | H04N 7/142 348/14.02 |
| 2009/0315769 | A1 * | 12/2009 | Whelan | G01S 19/256 342/357.44 |
| 2014/0206383 | A1 * | 7/2014 | Nishikawa | H04W 4/046 455/456.1 |
| 2015/0019125 | A1 * | 1/2015 | Mazanec | G01C 21/3682 701/410 |

* cited by examiner

*Primary Examiner* — Yuri Kan
(74) *Attorney, Agent, or Firm* — Ware, Fressola, Maguire & Barber LLP

(57) ABSTRACT

An atlas application enables an electronic display device to receive touch input from a user on a screen of the display device to access an atlas database to obtain graphic map information representative of a portion of the surface of the earth and to display the obtained graphic map information on the screen of the display as a graphic map showing a plurality of points of interest on the portion of the surface of the earth. The user is able to manipulate the graphic map by touch to locate and select a particular point of interest for detailed examination. The atlas data may contain at least one of descriptive textual information and graphic map information representative of particular points of interest selected by the user. A position of the device may be selected or determined to assist in presenting various points of interest for perusal.

29 Claims, 5 Drawing Sheets

APPARATUS AND METHODS FOR ACCESSING AN ATLAS APPLICATION AND A COMPUTER READABLE MEDIUM HAVING THE ATLAS APPLICATION STORED THEREON AND EXECUTABLE BY THE APPARATUS

BACKGROUND

"The Captain's Atlas" (out of print publication by Aviation Book Co; $2^{nd}$ edition (March 1994)) was a small (8½×11 inch) road atlas that had airways, VORs and some airports printed over the road maps in black line art. Pilots liked to have it in the cockpit. It was handy when making an announcement to point out some feature visible to passengers on the left or right side of the plane. In use, the pilot would thumb through the booklet to try to find the page with a map showing the part of the earth the aircraft was currently flying over and locate a point of interest identified on the map. This took some effort in determining the translational position of the aircraft in flight, finding the correct page in the atlas booklet, and determining a geographical, historical, etc. point of interest to announce. The pilot would then make a suitable announcement to passengers on the left or right side of the cabin to look out the window at the identified point. But passengers on the other side of the cabin couldn't enjoy the view without craning their necks to see or physically intruding into the seating area on the other side of the cabin.

SUMMARY

According to a first aspect of the present invention, a method is provided, comprising:

a portable electronic display device handled by a user in an aircraft in flight receiving a user input selecting an atlas application, wherein the portable electronic display device has a global positioning system application installed in the portable electronic display device, the portable electronic display device determining the position of the portable electronic device using the global positioning system application in response to a plurality of signals received from satellites of a global positioning system, the portable electronic display device accessing an atlas database through the atlas application to obtain atlas data representative of a portion of the surface of the Earth under the airborne aircraft corresponding to the determined position of the portable electronic device, and the portable electronic display device displaying a map of the portion of the surface of the Earth based on the accessed atlas data representative of the portion of the surface of the Earth under the aircraft corresponding to the determined position of the portable electronic device.

According to a second aspect of the present invention, a nontransitory computer readable medium is provided having a computer program stored thereon that is executable by a processor for causing a portable electronic display device to carry out the first aspect of the present invention.

According to a third aspect of the present invention, an apparatus is provided comprising at least one processor and at least one memory including the atlas application that is executable by the at least one processor to cause the apparatus at least to carry out the method according to the first aspect of the present invention.

According to a fifth aspect of the present invention, a portable electronic display device is provided comprising at least one processor and at least one memory including an atlas application that is executable by the at least one processor to cause the portable electronic display device at least to:

receive a touch input from a user selecting the atlas application on a screen of a display of the portable electronic display device viewable by the user for providing an atlas application launch signal, launch the atlas application in response to the atlas application launch signal and present the atlas application on the screen that prompts the user to input information corresponding to an aircraft flight, receive a user input of aircraft flight information and in response thereto provide at least one aircraft flight information signal indicative of the user input of aircraft flight information, access through the atlas application, in response to the at least one aircraft flight information signal, at least one atlas database to obtain one or more corresponding atlas data signals containing graphic map information representative of a portion of the surface of the Earth corresponding to the user input of aircraft flight information, display, at least in part, the graphic map information on the screen of the display as a graphic map showing a plurality of points of interest on the portion of the surface of the Earth corresponding to the user input of aircraft flight information and shown by the graphic map on the screen of the display, provide one or more touch signals, in response to one or more corresponding touches of the screen by the user to manipulate the graphic map in locating and selecting a particular point of interest for detailed examination by the user of details about the particular point of interest provided by the atlas application on the screen, the user selection made from among a plurality of points of interest provided by the atlas application and shown by the graphic map displayed on the screen of the display, access, in response to the one or more touch signals, the at least one atlas database through the atlas application to obtain one or more corresponding atlas data signals containing at least one of descriptive textual information and graphic map information representative of the particular point of interest selected by the user and located on a portion of the surface of the Earth corresponding to the particular point of interest selected by the user, and display on the portable electronic display device, in response to the obtained one or more corresponding atlas data signals, at least one of descriptive text about the particular point of interest selected by the user and a graphic map of the portion of the surface of the Earth corresponding to the particular point of interest selected by the user.

In accordance with the fifth aspect of the present invention, the atlas application may be executable by the at least one processor to cause the portable electronic display device at least to:

receive the touch input from the user selecting the atlas application on the screen of the display of the portable electronic display device when the user is onboard an aircraft in flight with the portable electronic display device viewable by the user for providing the atlas application launch signal, process, on an ongoing basis for use by the launched atlas application, a plurality of radio frequency signals received from a corresponding plurality of geostationary satellites that taken together are indicative of a current translational position of the portable electronic device to provide at least one current translational position signal indicative of the current translational position of the portable electronic device, access, in response to the at least one current translational position signal, the atlas database through the atlas application to obtain the one or more atlas data signals containing graphic map information representative of a portion of the surface of the Earth currently under the aircraft in flight corresponding to the current translational position of the portable electronic device, and display on the portable electronic display device, in response to the one or more atlas data signals, a graphic map of the portion of the surface of the Earth currently under the aircraft in flight based on the graphic map information contained in the one or more atlas data signals accessed from the atlas database.

In further accordance with the fifth aspect of the present invention, the atlas application may be made available by an airline for download over the Internet to portable electronic devices, and wherein the access may be to a proprietary atlas database made available via a wireless connection on flights made by fleet aircraft of the airline.

In accordance further with the fifth aspect of the present invention, the graphic map information may comprise geographical points or areas of interest that relate to physical features of the Earth and to at least one of historical events, current events, or political boundaries, and that are representable on the graphic map of the portion of the surface of the Earth corresponding to the user input of aircraft flight information. Moreover, the atlas application may be made available for download over the Internet to portable electronic devices. Similarly, the atlas application may be made available by an airline for download over the Internet to portable electronic devices, and wherein the access is to a proprietary atlas database made available via a short range wireless connection onboard aircraft flights made by fleet aircraft of the airline.

In further accord with the fifth aspect of the present invention, the portable electronic display device may be responsive to a course information signal provided by the airborne aircraft for accessing the atlas database to obtain the one or more atlas data signals containing graphic map information representative of a portion of the surface of the Earth currently under the airborne aircraft corresponding to the current translational position of the portable electronic device. The portable electronic display device may present the user with an option to select between a first mode of the atlas application that enables the portable electronic display device to respond to the plurality of radio signals received from the corresponding plurality of geostationary satellites and a second mode in which the portable electronic display device is responsive to the course information signal received from an avionics system aboard the airborne aircraft to access the atlas database through the atlas application to obtain the one or more atlas data signals containing graphic map information. The atlas application may be made available by an airline for download over the Internet to portable electronic devices for use in the second mode with the course information signal received from avionics systems made available via short range wireless connections on flights made by fleet aircraft of the airline, and wherein the access may be to a proprietary atlas database made available onboard the flights made by fleet aircraft of the airline.

In accord further with the fifth aspect of the present invention, the portable electronic display device may keep the displayed map current during translational movement of the aircraft along a course of the aircraft in flight.

In accord still further with the fifth aspect of the present invention, the atlas application may be executable by the at least one processor to cause the portable electronic display device at least to:

provide at least one sensed orientation signal from one or more sensors installed in the device, the at least one sensed orientation signal indicative of an orientation of the portable electronic device, access the atlas database through the atlas application to obtain the one or more atlas data signals containing graphic map information representative of a portion of the surface of the Earth currently under the airborne aircraft in response to the translational position signal and the sensed orientation signal, and display a map of the portion of the surface of the Earth based on the accessed atlas data representative of the portion of the surface of the Earth under the aircraft based on the graphic map information contained in the one or more atlas data signals accessed from the atlas database.

The portable electronic display device may keep the displayed map current according to the at least one of a current translational position signal and a current sensed orientation signal of the portable electronic display device. The graphic map information may comprise geographical points or areas of interest that relate to physical features of the Earth and at least one of historical events, current events, and political boundaries, and that are representable on the graphic map of the portion of the surface of the Earth currently under the aircraft in flight corresponding to the current translational position of the portable electronic display device and the current orientation of the portable electronic display device. The atlas application may be executable by the at least one processor to cause the portable electronic display device at least to:

receive a user input selecting a zoom input level and provide a zoom level signal indicative of the selected zoom input level, access the atlas database through the atlas application, in response to the at least one current translational position signal and the zoom level signal, to obtain atlas data representative of a portion of the surface of the Earth under the airborne aircraft corresponding to the determined translational position and orientation of the portable electronic device as well as the selected zoom input level, and display a graphic map of the portion of the surface of the Earth currently under the aircraft based on the graphic map information contained in the one or more atlas data signals accessed from the atlas database.

In still further accord with the fifth aspect of the present invention, the atlas application may be executable by the at least one processor to cause the portable electronic display device at least to:

receive a user input selecting a zoom input level and provide a zoom level signal indicative of the selected zoom input level, access the atlas database through the atlas application, in response to the at least one current translational position signal and the zoom level signal, to obtain atlas data representative of a portion of the surface of the Earth under the aircraft in flight corresponding to the determined translational position of the portable electronic device and the selected zoom input level, and display a graphic map of the portion of the surface of the Earth currently under the aircraft based on the graphic map information contained in the one or more atlas data signals accessed from the atlas database.

Still further in accord with the fifth aspect of the present invention, the atlas application may be made available by an airline for download over the Internet to portable electronic devices, and wherein the access may be to a proprietary atlas database made available onboard flights made by fleet aircraft of the airline.

According to a sixth aspect of the present invention, a method is provided, comprising:

a passenger communication system aboard a passenger aircraft airborne over Earth obtaining, on an ongoing basis during a flight, a course and heading signal or at least one of a current course signal and a current heading signal indicative, respectively, of at least a current translational position and a current heading of the aircraft airborne over the Earth, retrieving, in response to the course and heading signal or in response to the at least one of a current course signal and a current heading signal, an atlas data signal having graphic map information representative of a portion of the Earth under the airborne passenger aircraft corresponding at least to the current translational position of the airborne passenger aircraft, wherein the atlas data signal is retrieved from a storage device having an atlas database stored thereon and wherein the graphic map information is displayable as a graphic map of the portion of the Earth currently under the airborne passenger aircraft showing geographic features and points or areas of interest that relate to at least one of historical events, current events, and political boundaries shown positioned in relation to the geographic features, and transmitting the retrieved atlas data signal to one or more passenger display devices in the aircraft for display.

In accordance with the sixth aspect of the present invention, each passenger display device may be controllable by a corresponding passenger seated in the airborne passenger aircraft providing a passenger display activation input to activate the display and a passenger atlas selection input to select an atlas application for use on the passenger display in viewing a display of the passenger display device, each activated display device that selects the atlas application receiving the transmitted atlas data signal for displaying the graphic map of the portion of the Earth currently under the airborne passenger aircraft and individually controllable by the corresponding passenger to zoom the map for accessing greater or lesser detail at, respectively, simulated lesser or greater altitude by transmitting an individual passenger zoom command signal to the passenger communication system, and retrieving, in response to each individual passenger zoom command signal, zoomed graphic map information and transmitting a retrieved atlas data signal with the zoomed graphic map information to each passenger display device according to the individual zoom command signal received from a corresponding passenger display device.

In further accord with the sixth aspect of the present invention, the course and heading signal or the at least one of the current course signal and the current heading signal may be based on information provided by an avionics system on board the passenger aircraft.

In still further accord with the sixth aspect of the present invention, the course and heading signal or the at least one of the current course signal and the current heading signal may be based on information provided by a global positioning system (GPS) navigation device that determines geographic location by receiving information from at least four GPS satellites.

According to a seventh aspect of the present invention, a communication system comprises:

at least one storage device; and at least one signal processor aboard a passenger aircraft, responsive on an ongoing basis when the passenger aircraft is airborne to a course and heading signal or at least one of a current course signal and a current heading signal indicative, respectively, of at least a current translational position and a current heading of the airborne passenger aircraft, for retrieving atlas data representative of a portion of the surface of the Earth under the airborne passenger aircraft corresponding at least to the current translational position of the airborne passenger aircraft, wherein the atlas data is retrieved from an atlas database stored on the at least one storage device and wherein the graphic map information comprises a graphic map showing geographic features, and points or areas of interest that relate to at least one of historical events, current events and political boundaries shown positioned in relation to the geographic features, and that are representable on a graphic map of the portion of the surface of the Earth currently under the airborne aircraft corresponding to the current translational position of the airborne passenger aircraft, and for transmitting the retrieved atlas data to one or more passenger display devices in the passenger aircraft.

In accordance with the seventh aspect of the present invention, each of the one or more passenger display devices may be controllable by a corresponding passenger seated in the airborne passenger aircraft by providing a passenger display activation input to activate the display and a passenger atlas selection input to select an atlas application for use on the passenger display device in viewing a display of the passenger display device, each activated passenger display device that selects the atlas application receiving the transmitted atlas data for displaying a map of the portion of the surface of the Earth currently under the airborne passenger aircraft and individually controllable by the corresponding passenger to zoom the imagery for accessing greater or lesser detail by transmitting an individual passenger zoom command to the signal processor, wherein the signal processor is responsive to each individual passenger zoom command, for retrieving corresponding zoomed graphic map information and for transmitting retrieved zoomed graphic map information data to each passenger display device according to the corresponding individual zoom command received from a corresponding passenger display device.

According to an eighth aspect of the present invention, a method is provided, comprising a portable electronic display device receiving a touch input from a user selecting an atlas application on a screen of a display of the portable electronic display device viewable by the user for providing an atlas application launch signal, launching the atlas application in response to the atlas application launch signal and presenting the atlas application on the screen and prompting the user to input information corresponding to an aircraft flight, receiving a user input of aircraft flight information and providing at least one aircraft flight information signal indicative of the user input of aircraft flight information, accessing through the atlas application, in response to the at least one aircraft flight information signal, at least one atlas database to obtain one or more corresponding atlas data signals containing graphic map information representative of a portion of the surface of the Earth corresponding to the user input of aircraft flight information, displaying, in response to the one or more corresponding atlas database signals, at least in part, the graphic map information on the screen of the display as a graphic map showing geographic features including a plurality of points of interest on the portion of the surface of the Earth corresponding to the user input of aircraft flight information and shown by the graphic map on the screen of the display, providing one or more touch signals, in response to one or more corresponding touches of the screen by the user to manipulate the graphic map in locating and selecting a particular point of interest for detailed examination by the user of details about the particular point of interest provided by the atlas application on the screen, the user selection made from among the plurality of points of interest provided by the atlas application and shown by the graphic map displayed on the screen of the display, accessing, in response to the one or more touch signals, the at least one atlas database through the atlas application to obtain one or more corresponding atlas data signals containing at least one of descriptive textual information and graphic map information representative of the particular point of interest selected by the user and located on a portion of the surface of the Earth corresponding to the particular point of interest selected by the user, and displaying on the portable electronic display device, in response to the obtained one or more corresponding atlas data signals, at least one of descriptive text about the particular point of interest selected by the user and a graphic map of the portion of the surface of the Earth corresponding to the particular point of interest selected by the user.

According to a ninth aspect of the present invention, a nontransitory computer readable medium is provided having an atlas application stored thereon that is executable by a processor for causing the electronic display device to carry out the method according to the eighth aspect of the present invention.

DETAILED DESCRIPTION

Figure 1:
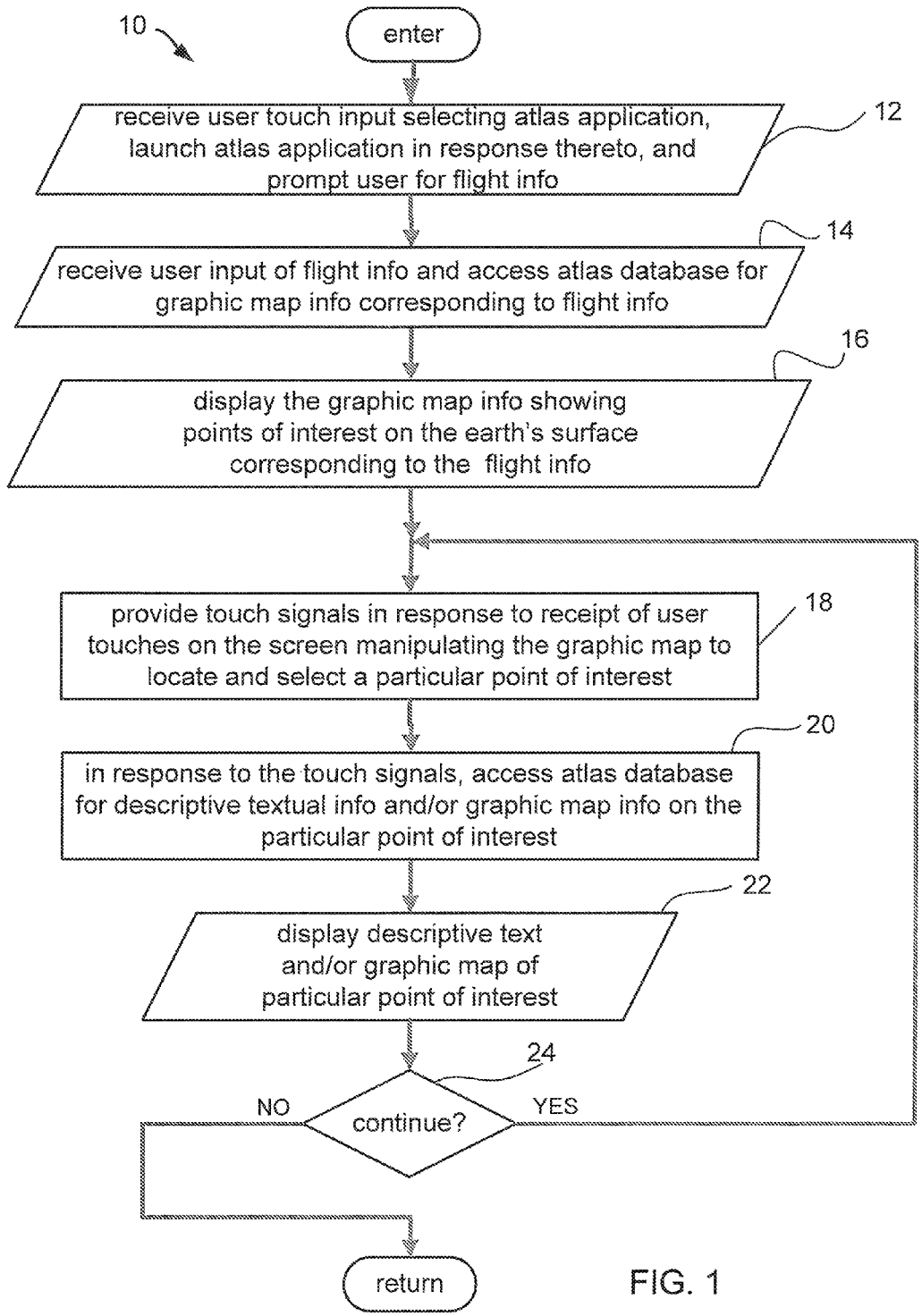
FIG. 1 shows an exemplary method for displaying graphic map information showing points of interest on the earth's surface corresponding to flight information.
Figure 2:
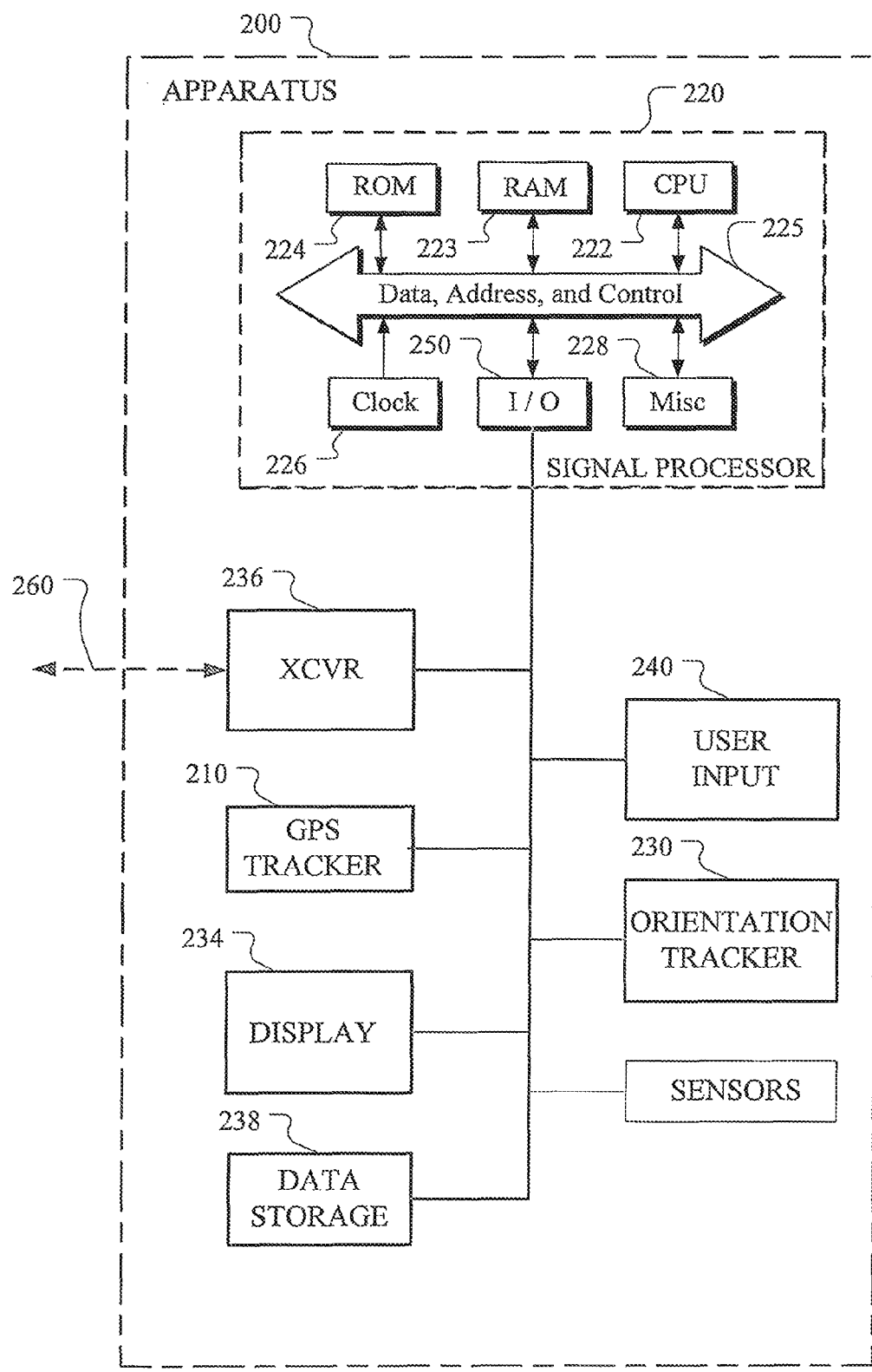
FIG. 2 shows an embodiment of an apparatus capable of carrying out the methods shown in FIGS. 1, 3, and 4.

FIG. 1 shows an example of a method 10, according to an embodiment, carried out on an exemplary apparatus 200 as shown in FIG. 2. The apparatus 200 may include at least one signal processor 220 that includes at least one central processing unit (CPU) 222 and at least one memory device 224 including a computer program that executes, at least in part, the steps shown in the embodiment of FIG. 1 as an atlas application. In other words, the atlas application comprises steps such as shown in whole or in part in FIG. 1. Those steps may be expressed as a combination of computer instructions and data definitions that enable a computer such as the central processing unit 222 shown in FIG. 2 to perform acts of computation or control. Thus, such instructions may take the form of a software application such as an atlas application as outlined in FIG. 1 or FIGS. 3 and 4. Such software is sometimes referred to as comprising computer program code that likewise comprises computer instructions and data definitions expressed in a programming language or in a form output by an assembler, compiler, or other translator. An atlas application comprising computer program code is thus able, together with at least one central processing unit 222, to cause the apparatus 200 at least to carry out certain steps such as outlined in whole or in part in FIG. 1 or in FIGS. 3 and 4. The method steps shown herein may be coded by a computer programmer so as to express the method steps in a programming language. In an exemplary embodiment, the apparatus 200 may be a portable electronic display device such as a tablet or smartphone. Such a portable electronic device is carried by a user as the user travels and is moreover typically used, once the user is settled, in a handheld manner with the user holding the device in at least one hand in such a way that the display screen of portable electronic device faces the face of the user for comfortable viewing. A tablet is a mobile or portable electronic computer with a display, circuitry and a battery in a single unit. It comes equipped with sensors, e.g., including cameras, a microphone, an accelerometer, a touchscreen, and a GPS receiver. It may include one or more physical buttons to control certain functions such as on, off, audio volume, and silencing. Most include a jack for insertion of a headphone or earphone plug. Many include one or more ports for network communications, to charge the battery, or to insert a flash memory card or stick. On-screen features may include a pop-up touchscreen keyboard for typing. A touch input allows the user to navigate easily and type with a virtual keyboard on the screen. The tablet responds to the touches, which allows integrated hand-eye operation by the user. Known touchscreen hardware includes resistive and capacitive touchscreens. Known tablets include Apple iPad that operate using the Apple operating system. Tablets of other manufacturers such as the Samsung Galaxy, Kindle Fire and the Nook run the Android operating system provided by Google. Tablets are usually larger than smartphones with screens that may be 7 inches (diagonally) or larger. Smartphones also operate under the Apple and Android operating systems and have hardware similar to that described above for tablets. Tablets may also be equipped with stands so that the tablet may be temporarily supported on a surface such as table for hands-free usage. A tablet or a smartphone may thus be supported on a drop-down tray of a seatback of an aircraft or hand-held and handled by a user to operate the portable electronic device in the aircraft in flight at a certain altitude over the surface of the earth at a certain latitude and longitude and heading in a certain direction at a certain speed. In other words, the aircraft has a certain translatory (translational) position (in three degrees of freedom) and attitude (three degrees of freedom) as it moves through three dimensional space in all six degrees of freedom with respect to a reference coordinate system such as an earth-referenced coordinate system. Such an exemplary portable electronic display device 200 may include a user input interface arrangement such as shown as a user input device 240 that is responsive to receiving a user input. Such a user input might be made by a finger or stylus touching a touch sensitive screen surface (touchscreen) of an electronic display 234, e.g. a display capable of displaying images such as stills or video. Known displays include a liquid crystal display (LCD), a light-emitting diode display (LED), an organic light emitting diode display (OLED), etc. Thus, as shown in a step 12 in FIG. 1, the user input device 240 of the exemplary apparatus 200 of FIG. 2 may condition the sensed touch input and send a signal over the bus shown in FIG. 2 to the signal processor 220 that includes the above mentioned at least one CPU 222 and the at least one memory device 224. The received touch input from the user may select an atlas application displayed as an icon on the screen of the display 234 of the exemplary portable electronic display device 200. When the user is in the aircraft in flight with the portable electronic display device in the vicinity of the user, e.g., held in the hand or hands of the user, the screen is visible to the user and map imagery presented via the atlas application is viewable by the user. In response to the user input, an atlas application launch signal may be generated by the signal processor 220. If the atlas application is stored on the Read Only Memory (ROM) 224, the atlas application launch signal may be used internally within the signal processor 220 to launch the atlas application. Or, it could be transmitted to a memory device 238 that may have the executable code for running the atlas application stored therein. The launch of the atlas application causes the atlas application to be presented on the screen. In an embodiment, it may then prompt the user to input information corresponding to an aircraft flight.

The prompted user may then enter flight information pertaining to the flight. This may be done in flight but of course may be done in advance of the user boarding the aircraft or while on board but before taking off. In any event, as shown in a step 14 a user input of aircraft flight information is received and, in response, the apparatus 200 provides at least one aircraft flight information signal indicative of the user input of aircraft flight information. Again, this may be provided within the signal processor or to another device such as a data storage device 238 or even external to the apparatus 200 via a transceiver 236. The data storage 238 may for instance be a hard disk drive, a flash memory device, non-volatile RAM, or any suitable non-volatile storage medium that stores digital data. The transceiver includes both a transmitter and a receiver which are combined to share common circuitry or a single housing. If no circuitry is common, it is a transmitter-receiver. If it is a radio frequency (RF) transceiver, RF circuitry modules are included for high speed data transmission. Such circuitry may convert between digital baseband signals and analog RF signals in a digital-RF architecture. Transceivers are called Medium Attachment Units (MAUs) in IEEE 802.3 standard specifications. The transceiver may instead be a modem which is similar to a transceiver, except that it uses modulation and demodulation for transmitted and received signals, respectively. The transceiver may instead be a transponder or transceiver that converts between a full-duplex electrical signal and a full-duplex optical signal, depending on whether the interface is parallel or serial, respectively. It is also possible for a wavelength conversion to be carried out with e.g. two transceivers placed back to back. Other transceiver-like interfaces are possible as well.

In response, the apparatus 200 (through the atlas application) accesses at least one atlas database to obtain one or more corresponding atlas data signals containing graphic map information representative of a portion of the surface of the earth corresponding to the user input of aircraft flight information. The atlas database may for instance be stored on the data storage device 238 but may be stored elsewhere, either within the apparatus 200, on a removable memory device, or externally accessed from storage on another atlas data storage medium via the transceiver 236.

As shown in a step 16, the apparatus then displays, at least in part, the graphic map information on the screen of the display as a graphic map showing a plurality of points of interest on the portion of the surface of the earth corresponding to the user input of aircraft flight information and shown by the graphic map on the screen of the display.

The user may provide one or more touches to the screen, as shown in a step 18 in FIG. 1, to manipulate the graphic map. The touches may be for the purpose of locating and selecting a particular point of interest for detailed examination by the user of details about the particular point of interest provided by the atlas application on the screen.

As shown in a step 20, in response to the one or more touch signals, the at least one atlas database is accessed through the atlas application to obtain one or more corresponding atlas data signals containing at least one of descriptive textual information and graphic map information representative of the particular point of interest selected by the user and located on a portion of the surface of the earth corresponding to the particular point of interest selected by the user. In a step 22, in response to the obtained one or more corresponding atlas data signals, the portable electronic display device displays at least one of descriptive text about the particular point of interest selected by the user and a graphic map of the portion of the surface of the earth corresponding to the particular point of interest selected by the user. A decision 24 may then be made to continue by re-executing steps 18, 20, 22 or not. The decision may be made depending on continued user manipulation inputs, a user input returning to display the graphic map info as provided in step 16, or for other reasons depending on detailed implementations.

Figure 3:
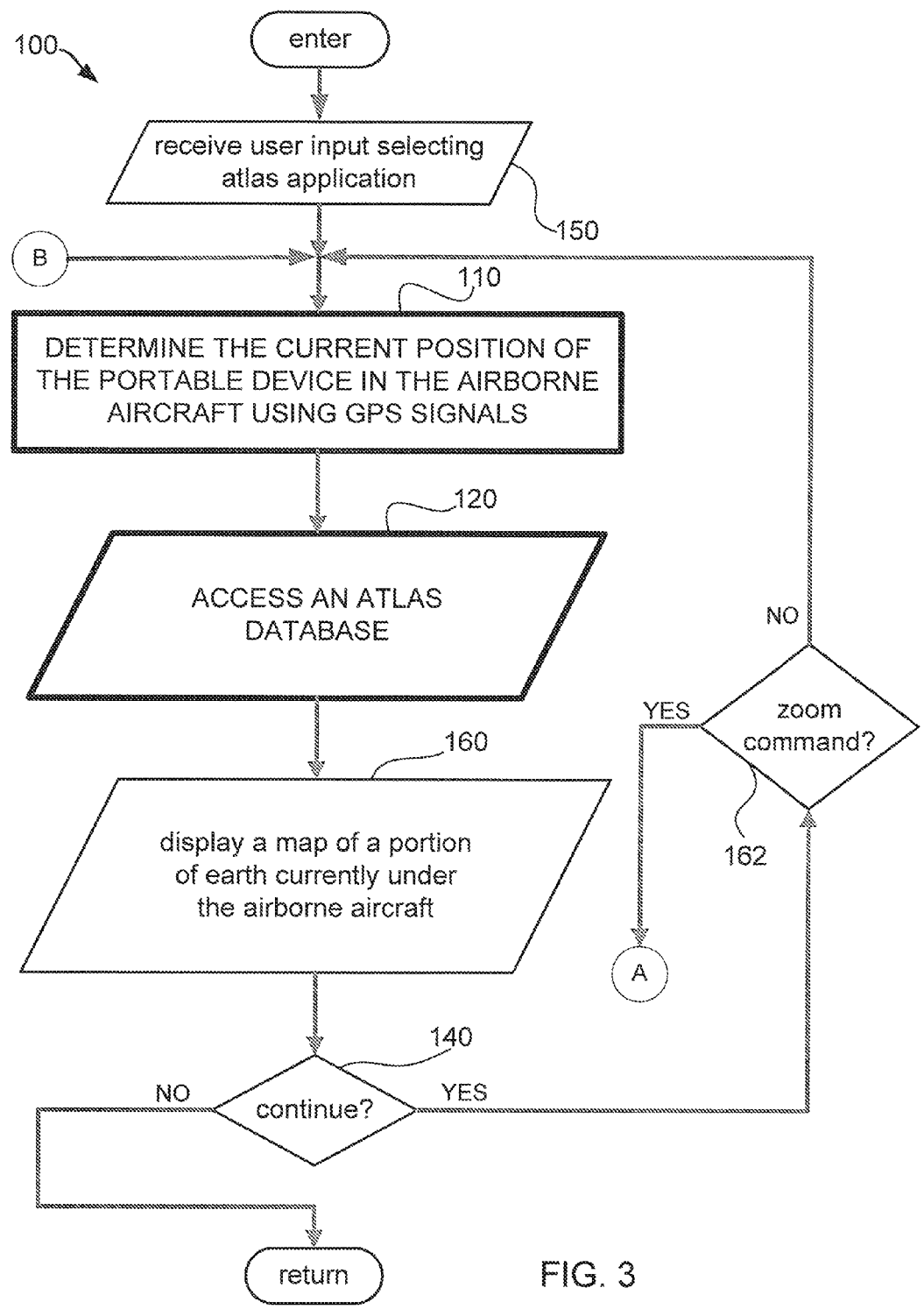
FIG. 3 shows another exemplary method for displaying graphic map information showing points of interest on the earth's surface corresponding to flight information.

FIG. 3 shows another exemplary embodiment of a method 100, according to an embodiment, carried out for instance on the exemplary apparatus 200 as shown in FIG. 2. As described previously, the apparatus 200 may include at least one processor 222 and at least one memory 224 including computer program code configured to, with the at least one processor, cause the apparatus at least to carry out certain steps such as those shown in FIG. 3. Again, in an exemplary embodiment, such an apparatus may be a portable electronic display device handled by a user prior to flight in an aircraft, or in an aircraft actually in flight. As before, such an exemplary portable electronic display device 200 may include a user input interface arrangement such as shown as a user input device 240 that is responsive to receiving a user input such as a touchscreen input to a display 234 by a finger or stylus touching a touch sensitive screen surface of the display 234. Thus, as shown in a step 150 in FIG. 3, the user input device 240 of the exemplary apparatus 200 of FIG. 2 may condition the sensed touch input and send a signal to a signal processor 220 that includes the above mentioned at least one central processing unit 222 and at least one memory 224. The received touch input from the user may select an atlas application displayed as an icon on the screen of the display 234 of the exemplary portable electronic display device 200. When the user is airborne in the aircraft with the portable electronic display device in the vicinity of the user, e.g., held in the hand or hands of the user the screen is visible to the user and map imagery presented via the atlas application is viewable by the user. In response to the user input, an atlas application launch signal may be generated by the signal processor 220. If the atlas application is stored on the Read Only Memory (ROM) 224, the atlas application launch signal may be used internally within the signal processor 220 to launch the atlas application. Or, it could be transmitted to a memory device 238 that may have the executable code for the atlas application stored therein. In any event, the exemplary portable electronic display device 200 has a global positioning system may include an application or other software in the form of computer program instructions, e.g., program code installed in the portable electronic display device 200 in a memory device 224 and/or a memory or data storage device 238. The apparatus 200 is also shown having a GPS tracker 210 that is responsive to radio signals from a plurality of geostationary satellites. The tracker by itself or the tracker in conjunction with the signal processor 220 is able to determine the position of the apparatus 200. More generally, since other nations have similar satellite systems, such a tracker may include a GNSS (Global Navigation Satellite System) antenna, a GNSS band pass filter (BPF), a temperature compensated crystal oscillator, and a GNSS Integrated Circuit (IC) that, may for instance be a combination GPS/GLONASS/Bluetooth/FM IC or an equivalent stand-alone GPS/GLONASS IC. The antenna may be a planar inverted-F antenna (a micro-strip built using a trace on a printed circuit board). An RF section may include a low noise amplifier (LNA), mixer, synthesizer, and intermediate frequency (IF) filter. A baseband section may include an acquisition engine, tracking channels, and a microprocessor. In the alternative, or in addition for purposes of augmentation, accelerometers may be used to sense accelerations in three translational degrees of freedom. The sensed accelerations may be twice integrated in each degree of freedom to arrive at respective values of positional changes in inertial space. A magnetometer may be used as well to measure the earth's magnetic field and determine heading information (relative to either magnetic or true north). It is also possible to use a gyrocompass or WiFi positioning.

As suggested above in connection with FIG. 1, user input may be received in a static way to determine information needed to access the atlas database in order to assist in presenting various points of interest for perusal in a circumscribed area related to flight information. For an alternative or for a further way to assist in this respect, the portable electronic display device 200 may be equipped to determine the position of the portable electronic device using a global positioning system application either continually or started up automatically in response to the launch of the atlas application. As shown in a step 110 the atlas application invokes the global positioning system (GPS) application to determine the current translational position of the portable device. The GPS application is responsive to a plurality of radio signals received from a corresponding plurality of geostationary satellites of at least one of the known global positioning systems. The portable electronic display device may likewise be equipped to determine in the step 110 the translational position of the portable electronic device using other available information. Such might include for instance ground based signals sent from one or more base stations or from an avionic system on board the aircraft that, for purposes of the atlas application, has essentially the same translational position as the apparatus 200.

As shown in a step 120 the portable electronic display device may access an atlas database to obtain atlas data representative of a portion of the surface of the earth under the airborne aircraft corresponding to the determined translational position of the portable electronic device.

As shown in a step 160, the portable electronic display device may display a map of the portion of the surface of the earth based on the accessed atlas data representative of the portion of the surface of the earth under the aircraft corresponding to the determined translational position of the portable electronic device.

The portable electronic display device may keep the displayed map current during translational movement of the aircraft along a course of the aircraft in flight. For instance, if it is decided in a step 140 to continue, the steps 110, 120, 160 may be re-executed in a continuous loop until it is decided in the step 140 not to continue followed by a return. On the other hand, before re-execution of steps 110, 120, 160, a step 162 may be executed as shown to determine if a zoom command has been received from the user or not. If not, then the steps 110, 120, 160 may be re-executed. If so, a transition is made, as signified by a transition point "A," to execute the steps shown in FIG. 4. Thus, receipt of a user input selecting a zoom input level causes a zoom level signal to be provided indicative of the selected zoom input level. The zoom level signal may be provided from the display 234 or a user input 240 on the illustrated bus to the signal processor 220. The user input may be via a touchscreen, a mechanical button, or the like. This signal is used to access the atlas database through the atlas application, i.e., in response to the at least one current translational position signal and the zoom level signal, to obtain atlas data representative of a portion of the surface of the earth under the aircraft in flight corresponding to the determined translational position of the portable electronic device and the selected zoom input level. A graphic map of the portion of the surface of the earth currently under the aircraft may be displayed at the selected zoom level based on the graphic map information contained in the one or more atlas data signals accessed from the atlas database.

Figure 4:
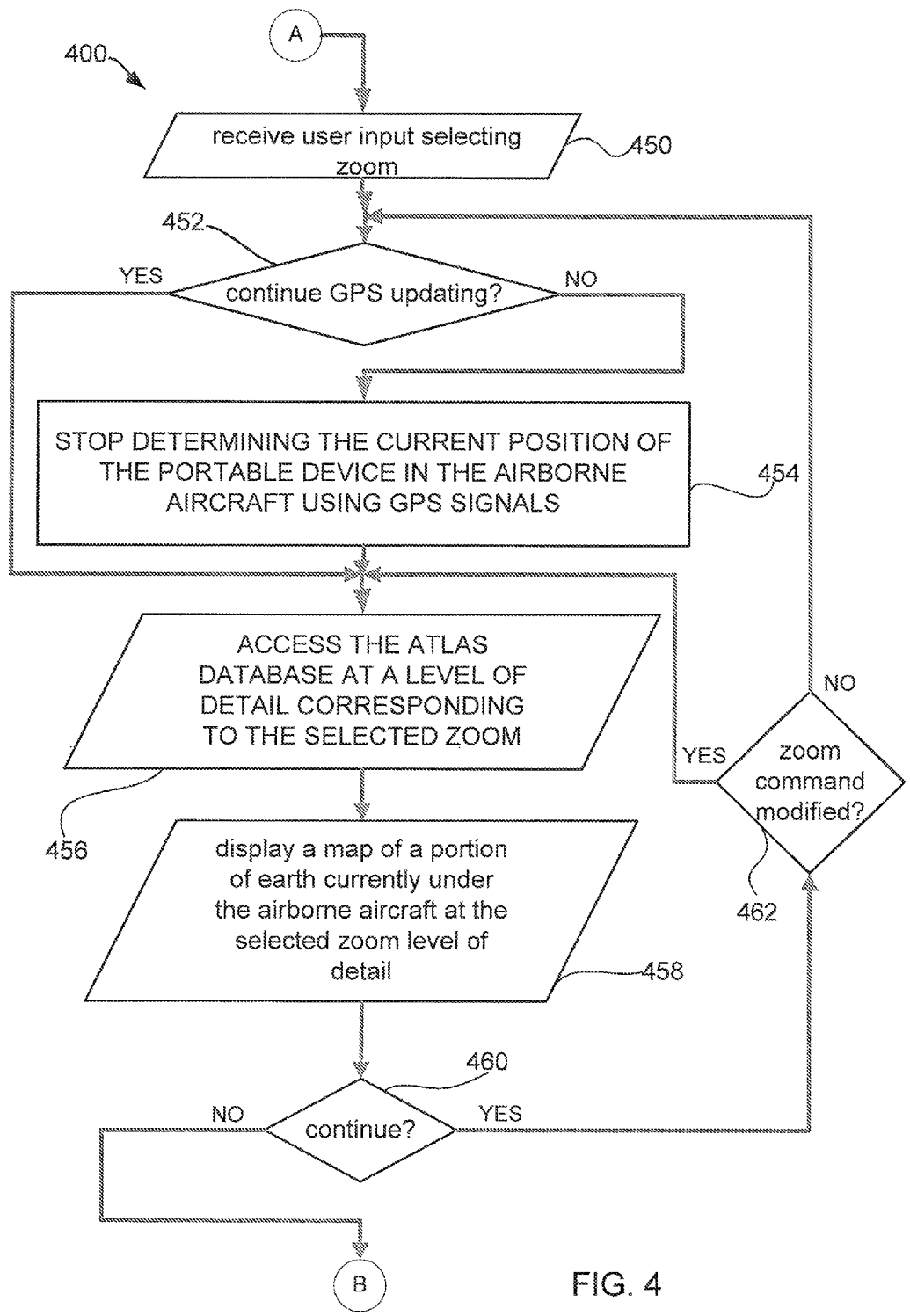
FIG. 4 shows how a zoom command is handled according to another exemplary method.

FIG. 4 shows entry into an additional set of steps of the atlas application starting at the transition point "A" after transitioning from a "Yes" decision in step 162 of FIG. 3. In a step 450, a zoom command is received via the user input device 240 or a touchscreen of display 234 such as a touch command selected from a menu, a manipulative touch gesture on the touchscreen, or the like. A step 452 may then be executed to determine if the user or the algorithm does or does not want to continue with GPS updating during the zooming operation. If not, a step 454 causes the apparatus to stop updating the displayed map information on the display so as to in effect freeze the zoomed upon area of interest for closer inspection. This might be desired if the zooming would cause an updating of the map information that would be too rapid to allow for stable viewing or reading of detail. On the other hand, if it is decided in the step 452 to continue with GPS updating, the map information continues to be updated as the aircraft moves over the surface of the earth. This could be experienced so as to give a sense of how fast the aircraft is flying over features shown on the earth's surface from the atlas database from the perspective of a lower altitude than the aircraft is actually flying at.

In any event, whether or not GPS updating is continued during the zooming operation, the atlas database is accessed, as shown in a step 456, at a level of detail corresponding to the selected zoom level. A map of the portion of the earth currently under the airborne aircraft is then displayed at the selected zoom level of detail, as shown in a step 458. A decision may be made in a step 460 as to whether to continue or not. If not, a transition is made as signified by a transition point "B" to renter the algorithmic steps shown in FIG. 3, beginning with step 110. If so, a decision may be executed in a step 462 to determine if the zoom command has been modified or not. If not, the step 452 may be re-executed followed by the step 454 or 456, as before. If so, the step 456 may be executed instead to access the atlas database at a level of detail corresponding to the modified zoom command. A map of the portion of the earth corresponding to the modified zoom command is then displayed based on the newly accessed data. Decision step 460 may be executed again, as before.

An orientation tracker 230 of FIG. 2 may be used by the signal processor 220 to cause the apparatus at least to provide one or more sensed orientation signals from one or more corresponding sensors associated with the orientation tracker 230 and installed in the apparatus 200. Various sensors may be employed for the purpose of sensing the orientation of the apparatus 200. For instance, a 3-axis MEMS-based gyroscope or separate (Sagnac effect) fiber optic gyroscopes may be employed. The sensors need not be individual orientation sensors in each degree of freedom but may be one device or more than one device combined as separate sensors. The at least one sensed orientation signal may be indicative an orientation of the portable electronic device, in other words its attitude in one or more of pitch, roll and yaw degrees of freedom with respect to a selected coordinate system such as an inertial reference system which if different may be transformed into correspondence with the translational reference coordinate system being used to track the translational position of the aircraft. In other words, transformation of the coordinate systems may be carried out if needed to bring different coordinate systems into alignment or other correspondence. The apparatus 200 may then determine, in the step 110, the current orientation of the portable device, in addition to its translational position with respect to a same coordinate system. The access to the atlas database through the atlas application is then made in the step 120 to obtain the one or more atlas data signals containing graphic map information representative of a portion of the surface of the earth currently under the airborne aircraft in response to both the translational position signal and the sensed orientation signal. In other words, the map information may contain views of the earth from the current translational position that show the earth to an appropriate degree (considering the altitude or zoom level) in corresponding elevational views if the portable device is tilted away from an orientation that is not parallel to the surface of the earth. The portable electronic display device then displays a map of the portion of the surface of the earth based on the accessed atlas data representative of the portion of the surface of the earth under and/or to the front, rear or side of the aircraft based on the graphic map information contained in the one or more atlas data signals accessed from the atlas database. As with translations alone, as explained above, the portable electronic display device may keep the displayed map current according to the at least one of a current translational position signal and a current sensed orientation signal of the portable electronic display device.

As suggested previously, the atlas application shown in embodiments hereof may be embodied in a nontransitory computer readable medium having computer program code stored thereon that is executable by a processor for causing a portable electronic display device to carry out methods such as described herein as shown in FIGS. 1, 3 and 4 and as described in other embodiments set forth below.

In embodiments hereof, the atlas application may be made available by an airline for download over the Internet to an apparatus 200 such as a portable electronic device, and the access in that case could be to a proprietary atlas database made available via a wireless connection such as WiFi on flights made by fleet aircraft of the airline. Such a database could be reserved on storage media already available on board aircraft of the airline. In other embodiments, the apparatus 200 may be a fixed device such as a seatback display and the atlas application may be made available on the seatback displays facing each passenger. Such seatback displays may be hardwired to a server on board the aircraft.

Figure 5:
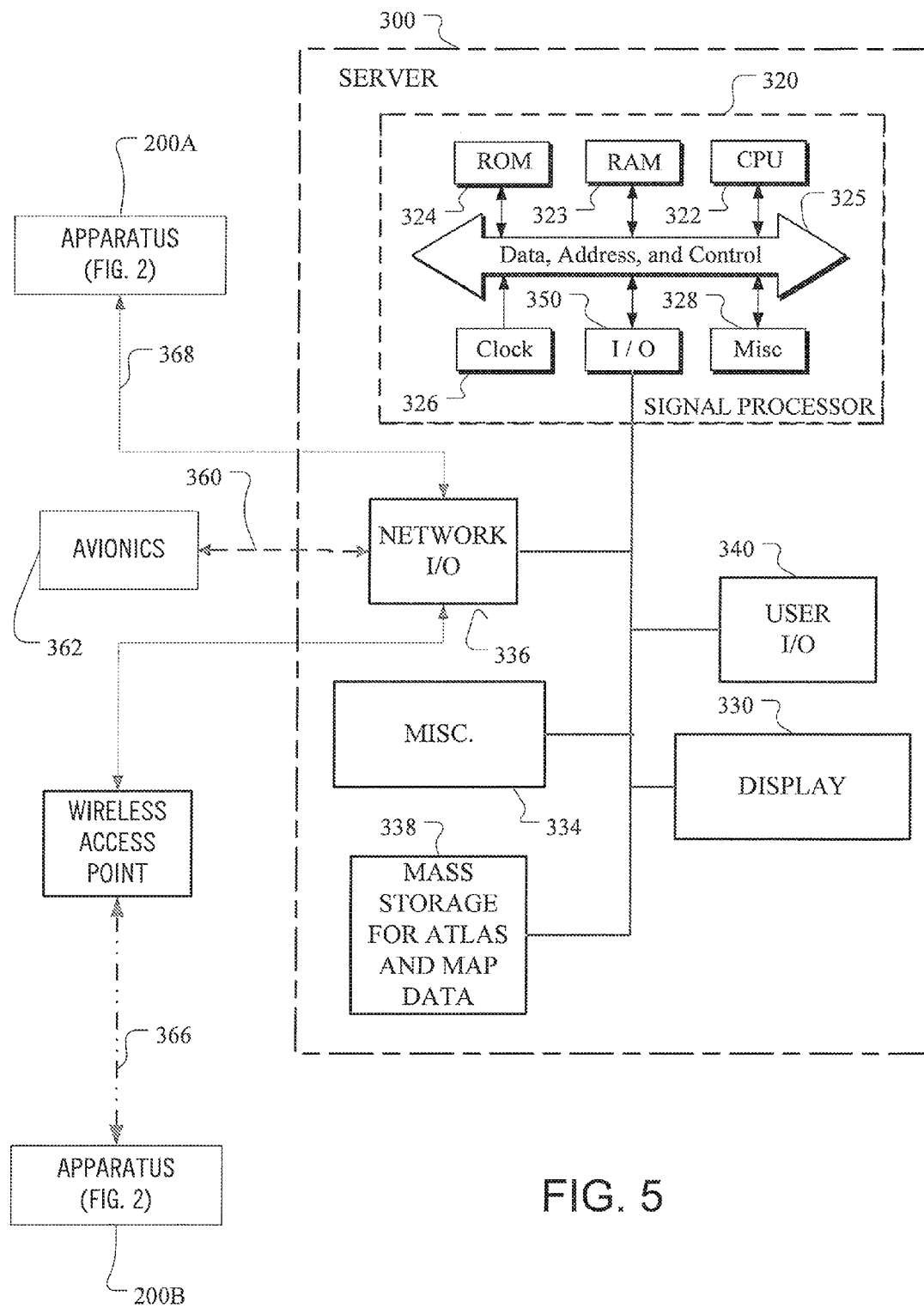
FIG. 5 shows a server providing atlas data to a plurality of devices such as the apparatus of FIG. 2.

In either event, as shown in FIG. 5, a communications system that may include a server 300 that may for instance be on board an aircraft, may contain a signal processor 320 with a CPU 322, RAM 323, ROM 324, a clock 326, miscellaneous hardware, firmware, and software 328, as well as input/output (I/O) port 350 connected to data, address and control lines 325. The I/O port 350 permits communication between the signal processor 320 and devices outside the signal processor that are shown interconnected by a bus within the server 300. Thus, the I/O port 350 may be connected by various signal lines (shown as a single common signal line as in FIG. 2) interconnecting various devices such as a display 330, miscellaneous hardware 334, network I/O 336, user I/O 340, and mass storage 338 for atlas and map data. The network I/O may be connected by a hardwired or wireless connection line 360 to other parts of the communications system such as an avionics system 362 on board the aircraft for assisting with storage and/or course, heading, altitude, and location information made available for instance through its proprietary application. In such a case, the apparatus 200A, 200B may be responsive to a course information signal from the communications system provided for instance by the avionics system 362 of the airborne aircraft via the network I/O 336 for accessing the atlas database to obtain the one or more atlas data signals containing graphic map information representative of a portion of the surface of the earth currently under the airborne aircraft and, by virtue of being on board the aircraft, in effect corresponding to the current translational position of the portable electronic device. In other words, considering the distances involved and the scale of the aircraft and portable device as compared to the earth's surface, the portable device and the aircraft may be considered to be at the same translational position. As shown, the network I/O 336 may be connected to a wireless access point that provides wireless access such as shown by a wireless connection line 366 to an apparatus 200B such as the apparatus 200 of FIG. 2 that may be a tablet belonging to a passenger. As before, the graphic map information includes geographical points or areas of interest that relate to historical or current events, cultural points of interest, political boundaries, and physical features of the earth and that are representatable on the graphic map of the portion of the surface of the earth currently under the aircraft in flight corresponding to the current translational position of the portable electronic display device and the current orientation of the portable electronic display device.

The portable electronic display device 200B may present the user with an option to select between a first mode of the atlas application that enables the portable electronic display device to respond to the plurality of radio signals received from the corresponding plurality of geostationary satellites and a second mode in which the portable electronic display device is responsive to the course information signal received from the avionics system 362 aboard the airborne aircraft. Depending on the mode, the portable device uses the data as appropriate to access the atlas database through the atlas application to obtain the one or more atlas data signals containing graphic map information. For the second mode, the atlas application may made available by an airline for download over the Internet to portable electronic devices for use in the second mode with the course information signal received from avionics systems made available via short range wireless connections on flights made by fleet aircraft of the airline, and wherein the access is to a proprietary atlas database made available onboard the flights made by fleet aircraft of the airline.

It is also contemplated that a network I/O device such as the network I/O device 336 may be connected to display devices such as the device 200A provided in the aircraft, for instance mounted on seat backs for viewing by passengers and provided with individual controls. Such devices may be immobile and hardwired as shown by the line 368 or may be mounted for easy removal by a quick disconnect for handheld wired or wireless use as tablets when disconnected from the seatback.

Regardless of the source of the information, the graphic map information may include geographical points or areas of interest that relate to historical or current events, information having cultural significance, political boundaries, and physical features of the earth and that are representable on the graphic map of the portion of the surface of the earth corresponding to the user input of aircraft flight information and/or the tracked aircraft position.

The atlas application may be made available by an independent vendor for download over the Internet to portable electronic devices. It may be made available in conjunction with information concerning flight plans filed through a regulatory body such as the United States Federal Aviation Agency (FAA) and/or that may relate to published flights made available by online services or airlines.

The invention claimed is:

1. A method, comprising:
    a portable electronic display device handled by a user in an aircraft in flight receiving a user input selecting an atlas application, wherein the portable electronic display device has a global positioning system application installed in the portable electronic display device,
    the portable electronic display device determining a position of the portable electronic device using the global positioning system application in response to a plurality of signals received from satellites of a global positioning system,
    the portable electronic display device accessing an atlas database through the atlas application to obtain atlas data representative of a portion of the surface of the Earth under the airborne aircraft corresponding to the determined position of the portable electronic device,
    the portable electronic display device displaying a map of the portion of the surface of the Earth based on the accessed atlas data representative of the portion of the surface of the Earth under the aircraft corresponding to the determined position of the portable electronic device, and
    the portable electronic display device responsive to the user providing a user input selecting to zoom the displayed map of the portion of the surface of the Earth, and, in response thereto updating the position of the portable electronic device using the global positioning system application.

2. A nontransitory computer readable medium having a computer program stored thereon that is executable by a processor for causing a portable electronic display device to carry out the method of claim 1.

3. An apparatus comprising at least one processor and at least one memory including the atlas application that is executable by the at least one processor to cause the apparatus at least to carry out the method of claim 1.

4. A portable electronic display device comprising
    at least one processor and at least one memory including an atlas application that is executable by the at least one processor to cause the portable electronic display device at least to:
    receive a touch input from a user selecting the atlas application on a screen of a display of the portable electronic display device viewable by the user for providing an atlas application launch signal,
    launch the atlas application in response to the atlas application launch signal and present the atlas application on the screen that prompts the user to input information corresponding to an aircraft flight,
    receive a user input of aircraft flight information and in response thereto provide at least one aircraft flight information signal indicative of the user input of aircraft flight information,
    access through the atlas application, in response to the at least one aircraft flight information signal, at least one atlas database to obtain one or more corresponding atlas data signals containing graphic map information representative of a portion of the surface of the Earth corresponding to the user input of aircraft flight information,
    display, at least in part, the graphic map information on the screen of the display as a graphic map showing a plurality of points of interest on the portion of the surface of the Earth corresponding to the user input of aircraft flight information and shown by the graphic map on the screen of the display,
    provide one or more touch signals, in response to one or more corresponding touches of the screen by the user to manipulate the graphic map in locating and selecting a particular point of interest for detailed examination by the user of details about the particular point of interest provided by the atlas application on the screen, the user selection made from among a plurality of points of interest provided by the atlas application and shown by the graphic map displayed on the screen of the display,
    access, in response to the one or more touch signals, the at least one atlas database through the atlas application to obtain one or more corresponding atlas data signals containing at least one of descriptive textual information and graphic map information representative of the particular point of interest selected by the user and located on a portion of the surface of the Earth corresponding to the particular point of interest selected by the user, and
    display on the portable electronic display device, in response to the obtained one or more corresponding atlas data signals, at least one of descriptive text about the particular point of interest selected by the user and a graphic map of the portion of the surface of the Earth corresponding to the particular point of interest selected by the user.

5. The portable electronic display device of claim 4 wherein the atlas application is executable by the at least one processor to cause the portable electronic display device at least to:
    receive the touch input from the user selecting the atlas application on the screen of the display of the portable electronic display device when the user is onboard an aircraft in flight with the portable electronic display device viewable by the user for providing the atlas application launch signal,
    process, on an ongoing basis for use by the launched atlas application, a plurality of radio frequency signals received from a corresponding plurality of geostationary satellites that taken together are indicative of a current translational position of the portable electronic device to provide at least one current translational position signal indicative of the current translational position of the portable electronic device, access, in response to the at least one current translational position signal, the atlas database through the atlas application to obtain the one or more atlas data signals containing graphic map information representative of a portion of the surface of the Earth currently under the aircraft in flight corresponding to the current translational position of the portable electronic device, and display on the portable electronic display device, in response to the one or more atlas data signals, a graphic map of the portion of the surface of the Earth currently under the aircraft in flight based on the graphic map information contained in the one or more atlas data signals accessed from the atlas database.

6. The portable electronic device of claim 5, wherein the atlas application is made available by an airline for download over the Internet to portable electronic devices, and wherein the access is to a proprietary atlas database made available via a wireless connection on flights made by fleet aircraft of the airline.

7. The portable electronic display device of claim 5, wherein the graphic map information comprises geographical points or areas of interest that relate to physical features of the Earth and to at least one of historical events, current events, or political boundaries, and that are representable on the graphic map of the portion of the surface of the Earth corresponding to the user input of aircraft flight information.

8. The portable electronic device of claim 7, wherein the atlas application is made available for download over the Internet to portable electronic devices.

9. The portable electronic device of claim 7, wherein the atlas application is made available by an airline for download over the Internet to portable electronic devices, and wherein the access is to a proprietary atlas database made available via a short range wireless connection onboard aircraft flights made by fleet aircraft of the airline.

10. The portable electronic display device of claim 5, wherein the portable electronic display device is responsive to a course information signal provided by the airborne aircraft for accessing the atlas database to obtain the one or more atlas data signals containing graphic map information representative of a portion of the surface of the Earth currently under the airborne aircraft corresponding to the current translational position of the portable electronic device.

11. The portable electronic display device of claim 10, wherein the portable electronic display device presents the user with an option to select between
   a first mode of the atlas application that enables the portable electronic display device to respond to the plurality of radio signals received from the corresponding plurality of geostationary satellites and
   a second mode in which the portable electronic display device is responsive to the course information signal received from an avionics system aboard the airborne aircraft
   to access the atlas database through the atlas application to obtain the one or more atlas data signals containing graphic map information.

12. The portable electronic device of claim 11, wherein the atlas application is made available by an airline for download over the Internet to portable electronic devices for use in the second mode with the course information signal received from avionics systems made available via short range wireless connections on flights made by fleet aircraft of the airline, and wherein the access is to a proprietary atlas database made available onboard the flights made by fleet aircraft of the airline.

13. The portable electronic display device of claim 5, wherein the portable electronic display device keeps the displayed map current during translational movement of the aircraft along a course of the aircraft in flight.

14. The portable electronic display device of claim 5, wherein the atlas application is executable by the at least one processor to cause the portable electronic display device at least to:
   provide at least one sensed orientation signal from one or more sensors installed in the device, the at least one sensed orientation signal indicative of an orientation of the portable electronic device,
   access the atlas database through the atlas application to obtain the one or more atlas data signals containing graphic map information representative of a portion of the surface of the Earth currently under the airborne aircraft in response to the translational position signal and the sensed orientation signal, and
   display a map of the portion of the surface of the Earth based on the accessed atlas data representative of the portion of the surface of the Earth under the aircraft based on the graphic map information contained in the one or more atlas data signals accessed from the atlas database.

15. The portable electronic display device of claim 14, wherein the portable electronic display device keeps the displayed map current according to the at least one of a current translational position signal and a current sensed orientation signal of the portable electronic display device.

16. The portable electronic display device of claim 14, wherein the graphic map information comprises geographical points or areas of interest that relate to physical features of the Earth and at least one of historical events, current events, and political boundaries, and that are representable on the graphic map of the portion of the surface of the Earth currently under the aircraft in flight corresponding to the current translational position of the portable electronic display device and the current orientation of the portable electronic display device.

17. The portable electronic display device of claim 15, wherein the atlas application is executable by the at least one processor to cause the portable electronic display device at least to:
   receive a user input selecting a zoom input level and provide a zoom level signal indicative of the selected zoom input level,
   access the atlas database through the atlas application, in response to the at least one current translational position signal and the zoom level signal, to obtain atlas data representative of a portion of the surface of the Earth under the airborne aircraft corresponding to the determined translational position and orientation of the portable electronic device as well as the selected zoom input level, and
   display a graphic map of the portion of the surface of the Earth currently under the aircraft based on the graphic map information contained in the one or more atlas data signals accessed from the atlas database.

18. The portable electronic display device of claim 5, wherein the atlas application is executable by the at least one processor to cause the portable electronic display device at least to:

receive a user input selecting a zoom input level and provide a zoom level signal indicative of the selected zoom input level, access the atlas database through the atlas application, in response to the at least one current translational position signal and the zoom level signal, to obtain atlas data representative of a portion of the surface of the Earth under the aircraft in flight corresponding to the determined translational position of the portable electronic device and the selected zoom input level, and display a graphic map of the portion of the surface of the Earth currently under the aircraft based on the graphic map information contained in the one or more atlas data signals accessed from the atlas database.

19. The portable electronic display device of claim 5, wherein the atlas application is made available by an airline for download over the Internet to portable electronic devices, and wherein the access is to a proprietary atlas database made available onboard flights made by fleet aircraft of the airline.

20. A method, comprising:

a passenger communication system aboard a passenger aircraft airborne over Earth obtaining, on an ongoing basis during a flight, a course and heading signal or at least one of a current course signal and a current heading signal indicative, respectively, of at least a current translational position and a current heading of the aircraft airborne over the Earth, retrieving, in response to the course and heading signal or in response to the at least one of a current course signal and a current heading signal, an atlas data signal having graphic map information representative of a portion of the Earth under the airborne passenger aircraft corresponding at least to the current translational position of the airborne passenger aircraft, wherein the atlas data signal is retrieved from a storage device having an atlas database stored thereon and wherein the graphic map information is displayable as a graphic map of the portion of the Earth currently under the airborne passenger aircraft showing geographic features and points or areas of interest that relate to at least one of historical events, current events, and political boundaries shown positioned in relation to the geographic features, transmitting the retrieved atlas data signal to one or more passenger display devices in the aircraft for display, wherein each passenger display device is controllable by a corresponding passenger seated in the airborne passenger aircraft providing a passenger display activation input to activate the display and a passenger atlas selection input to select an atlas application for use on the passenger display in viewing a display of the passenger display device, each activated display device that selects the atlas application receiving the transmitted atlas data signal for displaying the graphic map of the portion of the Earth currently under the airborne passenger aircraft and individually controllable by the corresponding passenger to zoom the map for accessing greater or lesser detail at, respectively, simulated lesser or greater altitude by transmitting an individual passenger zoom command signal to the passenger communication system, and retrieving, in response to each individual passenger zoom command signal, zoomed graphic map information and transmitting a retrieved atlas data signal with the zoomed graphic map information to each passenger display device according to the individual zoom command signal received from a corresponding passenger display device.

21. The method of claim 1, further comprising:

the portable electronic display device accessing the atlas database through the atlas application to obtain an update of the atlas data representative of the portion of the surface of the Earth under the airborne aircraft corresponding to the updated position of the portable electronic device, and the portable electronic display device displaying a map of the portion of the surface of the Earth based on the accessed atlas data representative of the portion of the surface of the Earth under the aircraft corresponding to the updated position of the portable electronic device.

22. The method of claim 20, wherein the course and heading signal or the at least one of the current course signal and the current heading signal are based on information provided by an avionics system on board the passenger aircraft.

23. The method of claim 20, wherein the course and heading signal or the at least one of the current course signal and the current heading signal are based on information provided by a global positioning system (GPS) navigation device that determines geographic location by receiving information from at least four GPS satellites.

24. A communication system, comprising:

at least one storage device; and at least one signal processor aboard a passenger aircraft, responsive on an ongoing basis when the passenger aircraft is airborne to a course and heading signal or at least one of a current course signal and a current heading signal indicative, respectively, of at least a current translational position and a current heading of the airborne passenger aircraft, for retrieving atlas data representative of a portion of the surface of the Earth under the airborne passenger aircraft corresponding at least to the current translational position of the airborne passenger aircraft, wherein the atlas data is retrieved from an atlas database stored on the at least one storage device and wherein the graphic map information comprises a graphic map showing geographic features, and points or areas of interest that relate to at least one of historical events, current events and political boundaries shown positioned in relation to the geographic features, and that are representable on a graphic map of the portion of the surface of the Earth currently under the airborne aircraft corresponding to the current translational position of the airborne passenger aircraft, and for transmitting the retrieved atlas data to one or more passenger display devices in the passenger aircraft, wherein each of the one or more passenger display devices is controllable by a corresponding passenger seated in the airborne passenger aircraft by providing a passenger display activation input to activate the display and a passenger atlas selection input to select an atlas application for use on the passenger display device in viewing a display of the passenger display device, each activated passenger display device that selects the atlas application receiving the transmitted atlas data for displaying a map of the portion of the surface of the Earth currently under the airborne passenger aircraft and individually controllable by the corresponding passenger to zoom the imagery for accessing greater or lesser detail by transmitting an individual passenger zoom command to the signal processor, wherein the signal processor is responsive to each individual passenger zoom command, for retrieving corresponding zoomed graphic map information and for transmitting retrieved zoomed graphic map information data to each passenger display device according to the corresponding individual zoom command received from a corresponding passenger display device.

25. A nontransitory computer readable medium having a computer program stored thereon that is executable by a processor for causing a portable electronic display device to carry out the method of claim 21.

26. A method, comprising
a portable electronic display device receiving a touch input from a user selecting an atlas application on a screen of a display of the portable electronic display device viewable by the user for providing an atlas application launch signal,
the portable electronic display device launching the atlas application in response to the atlas application launch signal and presenting the atlas application on the screen and prompting the user to input information corresponding to an aircraft flight,
the portable electronic display device receiving a user input of aircraft flight information and providing at least one aircraft flight information signal indicative of the user input of aircraft flight information,
the portable electronic display device accessing through the atlas application, in response to the at least one aircraft flight information signal, at least one atlas database to obtain one or more corresponding atlas data signals containing graphic map information representative of a portion of the surface of the Earth corresponding to the user input of aircraft flight information,
the portable electronic display device displaying, in response to the one or more corresponding atlas database signals, at least in part, the graphic map information on the screen of the display as a graphic map showing geographic features including a plurality of points of interest on the portion of the surface of the Earth corresponding to the user input of aircraft flight information and shown by the graphic map on the screen of the display,
the portable electronic display device providing one or more touch signals, in response to one or more corresponding touches of the screen by the user to manipulate the graphic map in locating and selecting a particular point of interest for detailed examination by the user of details about the particular point of interest provided by the atlas application on the screen, the user selection made from among the plurality of points of interest provided by the atlas application and shown by the graphic map displayed on the screen of the display,
the portable electronic display device accessing, in response to the one or more touch signals, the at least one atlas database through the atlas application to obtain one or more corresponding atlas data signals containing at least one of descriptive textual information and graphic map information representative of the particular point of interest selected by the user and located on a portion of the surface of the Earth corresponding to the particular point of interest selected by the user, and
the portable electronic display device displaying on the portable electronic display device, in response to the obtained one or more corresponding atlas data signals, at least one of descriptive text about the particular point of interest selected by the user and a graphic map of the portion of the surface of the Earth corresponding to the particular point of interest selected by the user.

27. A nontransitory computer readable medium having an atlas application stored thereon that is executable by a processor for causing the electronic display device to carry out the method of claim 26.

28. The method of claim 1, further comprising:
the portable electronic display device, in response to the user providing the user input selecting to zoom the displayed map of the portion of the surface of the Earth, accessing the atlas database to obtain atlas data with greater or lesser detail at simulated lesser or greater altitude, respectively, and
the portable electronic display device displaying, in response to the user input selecting to zoom the displayed map, a zoomed map of the portion of the surface of the Earth corresponding to the user input selecting to zoom the displayed map.

29. A nontransitory computer readable medium having a computer program stored thereon that is executable by a processor for causing a portable electronic display device to carry out the method of claim 28.

* * * * *